United States Patent
Patterson, Jr. et al.

(10) Patent No.: US 9,966,612 B2
(45) Date of Patent: May 8, 2018

(54) AVOIDING FUEL STARVATION OF ANODE END FUEL CELL

(75) Inventors: Timothy W. Patterson, Jr., West Hartford, CT (US); Robert M. Darling, South Windsor, CT (US)

(73) Assignee: Audi AG, Ingolstadt (DE)

( * ) Notice: Subject to any disclaimer, the term of this patent is extended or adjusted under 35 U.S.C. 154(b) by 425 days.

(21) Appl. No.: 14/378,314

(22) PCT Filed: Feb. 24, 2012

(86) PCT No.: PCT/US2012/026553
§ 371 (c)(1),
(2), (4) Date: Aug. 12, 2014

(87) PCT Pub. No.: WO2013/126075
PCT Pub. Date: Aug. 29, 2013

(65) Prior Publication Data
US 2015/0004515 A1    Jan. 1, 2015

(51) Int. Cl.
| | | |
|---|---|---|
| *H01M 8/02* | (2016.01) | |
| *H01M 8/026* | (2016.01) | |
| *H01M 8/241* | (2016.01) | |
| *H01M 8/2465* | (2016.01) | |
| *H01M 8/10* | (2016.01) | |

(52) U.S. Cl.
CPC .......... *H01M 8/026* (2013.01); *H01M 8/241* (2013.01); *H01M 8/2465* (2013.01); *H01M 8/10* (2013.01)

(58) Field of Classification Search
CPC ........ H01M 8/026; H01M 8/10; H01M 8/241; H01M 8/2465
See application file for complete search history.

(56) References Cited

U.S. PATENT DOCUMENTS

| | | | |
|---|---|---|---|
| 6,824,901 B2 | 11/2004 | Reiser et al. | |
| 7,041,408 B1 | 5/2006 | Meyers | |
| 2005/0064263 A1* | 3/2005 | Goebel | H01M 8/0263 |
| | | | 429/514 |
| 2006/0222924 A1* | 10/2006 | Matsuoka | H01M 4/8605 |
| | | | 429/413 |

(Continued)

FOREIGN PATENT DOCUMENTS

| | | |
|---|---|---|
| JP | 5-190186 A | 7/1993 |
| JP | 6-251790 A | 9/1994 |

(Continued)

OTHER PUBLICATIONS

Machine translation of Japanese Patent Document JP 05-190186, published Jul. 30, 1993.*

*Primary Examiner* — Miriam Stagg
*Assistant Examiner* — Lilia Nedialkova
(74) *Attorney, Agent, or Firm* — Seed IP Law Group LLP

(57) ABSTRACT

The fuel flow channels (20a) of the end fuel cell (9a) at the anode end (34) of a fuel cell stack are significantly deeper than the fuel flow field channels (20) of the remaining fuel cells (9) in the stack, whereby fuel starvation caused by ice in the fuel flow channels is avoided during cold startup. The fuel flow field channels of the end cell (9) at the anode end of the stack is between about 0.15 mm and about 1.5 mm deeper than the fuel flow field channels in the remaining fuel cells of the stack, or between about 35% and about 65% deeper than the fuel flow field channels in the remaining fuel cells of the stack.

12 Claims, 1 Drawing Sheet

(56) References Cited

U.S. PATENT DOCUMENTS

| | | | |
|---|---|---|---|
| 2009/0186253 A1* | 7/2009 | Trabold | H01M 8/026 |
| | | | 429/446 |
| 2009/0202870 A1 | 8/2009 | Darling et al. | |
| 2010/0047650 A1* | 2/2010 | Iino | H01M 8/0213 |
| | | | 429/479 |
| 2011/0104582 A1 | 5/2011 | Patterson, Jr. et al. | |
| 2011/0281191 A1* | 11/2011 | Okanishi | H01M 8/026 |
| | | | 429/444 |
| 2012/0301810 A1* | 11/2012 | Kawajiri | H01M 8/026 |
| | | | 429/482 |

FOREIGN PATENT DOCUMENTS

| | | |
|---|---|---|
| JP | 2004-179061 A | 6/2004 |
| JP | 2005-190983 A | 7/2005 |
| JP | 2008-8536287 A | 9/2008 |
| WO | 2004/107839 A2 | 12/2004 |
| WO | 2008/105751 A2 | 9/2008 |
| WO | WO 2011089801 A1 * 7/2011 ............ H01M 8/026 |
| WO | 2011/112520 A1 | 9/2011 |

* cited by examiner

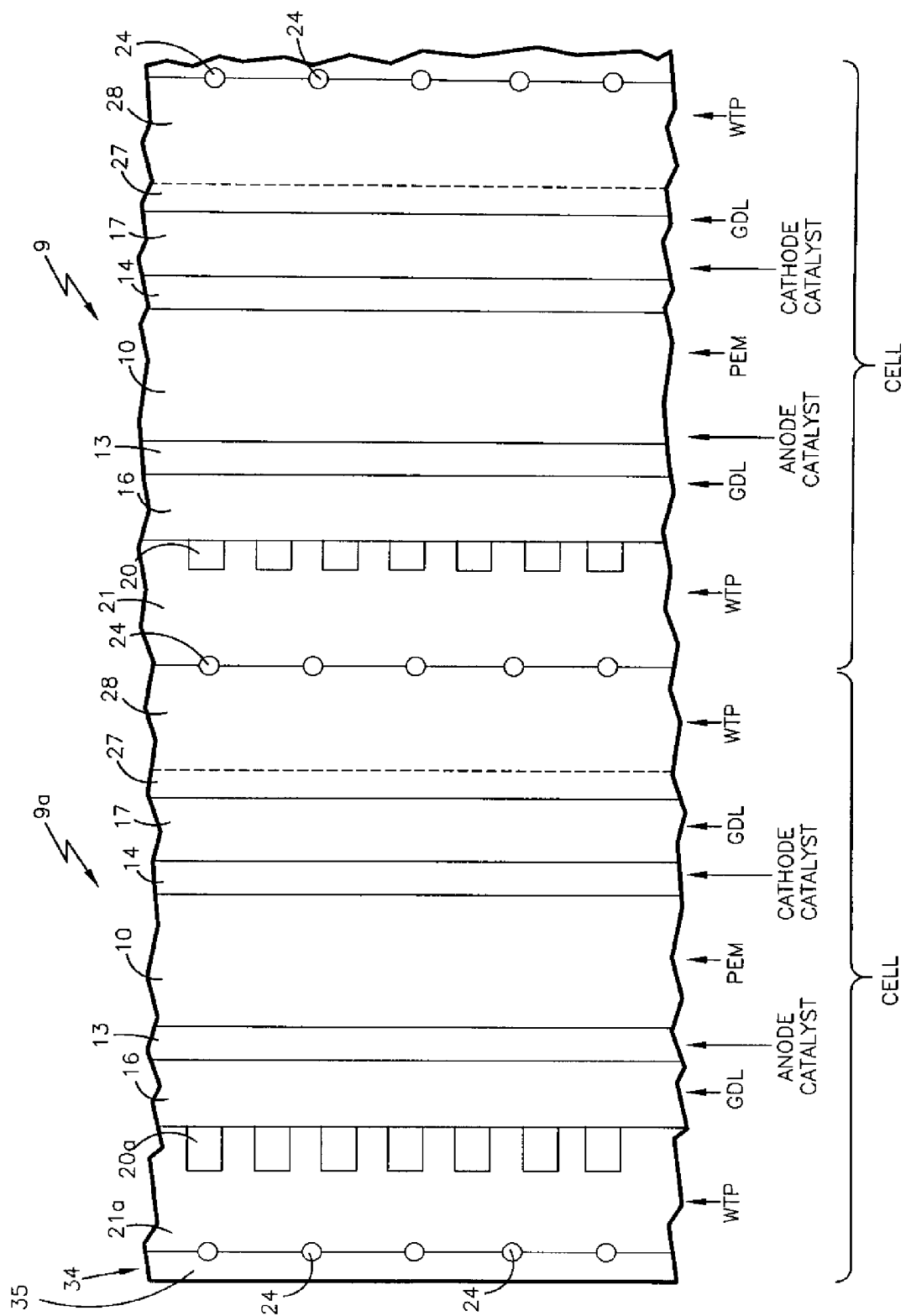

AVOIDING FUEL STARVATION OF ANODE END FUEL CELL

TECHNICAL FIELD

The anode of the fuel cell at the anode end of a fuel cell stack is provided with fuel flow field channels significantly deeper than fuel flow field channels in the other fuel cells of the stack. This allows sufficient fuel flow to avoid fuel starvation in the anode end cell during cold boot strap starts.

BACKGROUND ART

It has been previously suggested that the startup procedure for a fuel cell stack at subfreezing temperature is hampered by the presence of ice in the reactant flow fields. The ice prevents the reactant gases from reaching certain parts or even all of the electrodes' catalyst layer surfaces. To avoid such a situation, many proposals have been made for removing all of the water and water vapor from the stack when the stack is being shut down so that there is no possibility of ice being present upon re-establishing operation. Such systems are expensive, awkward, and quite time-consuming, and are certainly not at this time well suited for fuel cell power plants used in vehicles. The dry out of the cell stack assembly which is necessary for good cold start performance, can result in severe membrane stress, leading to untimely membrane failure.

Other approaches to the catalyst/ice problem include all sorts of heating methodologies, which are also expensive, cumbersome, require too much time, and are not well suited for vehicular applications This modality is predicated on the realization that poor end-cell performance in a fuel cell stack assembly a) during and following boot strap startup at sub-freezing temperatures, and b) resulting from freeze/thaw cycles, is caused by flooding. During start-up from frozen temperatures, the end cells on both the cathode and anode ends of the stack become flooded to the greatest degree.

SUMMARY

Herein, the "anode end of the stack" and "anode end" are defined as the end of the stack at which the anode of the fuel cell closest to that end is closer to that end than the cathode of the fuel cell closest to that end. Herein, "boot strap start" means starting electric production in a fuel cell stack with a load, by flowing reactants without first heating the stack or the reactants.

The modality herein is also predicated on the discovery that fuel starvation of the anode end cell severely reduces performance during startup, and promotes carbon corrosion of the anode end cell.

Surprisingly, the modality herein involves providing the fuel reactant flow field channel depth of the anode end cell to be significantly deeper than the depth of fuel reactant flow field channels in all of the other cells of the stack. As an example, an increase in the depth of the end cell fuel flow field channels of about 55% eliminated fuel starvation of the anode end cell. This modality may be implemented in a variety of ways and the depth increase can be stated in ranges relating to percentages (as above) or in terms of distance, with respect to typical fuel flow field channel depths. For instance, when the depth of the fuel flow field channels in the anode end cell is between about 35% and about 65% greater than the depth of the fuel flow field channels of the remaining fuel cells in the stack, fuel starvation of the anode end cell is avoided. The depth of the fuel channels in the anode end cell could be more than twice the depth of the other fuel channels in the other cells. In a fuel cell stack in which the depth of fuel flow field channels of the bulk of the fuel cells is on the order of 0.4 mm, increasing the depth in the fuel flow field channels of the anode end fuel cell by about 0.15 mm to about 1.5 mm, or preferably from about 0.15 mm to about 0.5 mm, or more preferably from about 0.15 mm to about 0.25 mm will substantially eliminate fuel starvation in the anode end fuel cell.

Other variations will become more apparent in the light of the following detailed description of exemplary embodiments, as illustrated in the accompanying drawings.

BRIEF DESCRIPTION OF THE DRAWINGS

The sole FIGURE is a fractional, side elevation view of a pair of contiguous fuel cells of one exemplary form with which the present arrangement may be utilized.

MODE(S) OF IMPLEMENTATION

Referring to the FIGURE, a pair of fuel cells 9, 9a, of one form with which the present arrangement may advantageously be utilized, each include a proton exchange membrane (PEM) 10. On one surface of the PEM 10 there is an anode catalyst layer 13 and on the opposite surface of the PEM there is a cathode catalyst layer 14. Adjacent the anode catalyst layer there is a porous anode gas diffusion layer (GDL) 16, and adjacent the cathode catalyst layer there is a porous cathode GDL 17. Fuel is supplied to the anode in fuel reactant gas flow field channels 20, 20a within an anode water transport plate (WTP) 21, 21a, which is sometimes also referred to as a fuel reactant flow field plate. The water transport plates 21, 21a are porous and at least somewhat hydrophilic to provide liquid communication between water channels 24 and fuel channels 20, 20a. The water channels 24 are formed in the opposite surface of the water transport plate from the fuel channels 20, 20a.

Similarly, air is provided through oxidant reactant gas flow field channels 27 which are depicted herein as being orthogonal to the fuel channels 20, 20a. The air channels 27 are formed on one surface of the cathode water transport plates 28 which have characteristics similar to those of the anode water transport plates 21, 21a.

The catalysts are conventional PEM-supported noble metal coatings typically mixed with a perfluorinated polymer, such as that sold under the tradename NAFION® which may or may not also contain Teflon®. The PEM 10 consists of a proton conductive material, typically perfluorinated polymer, such as that sold under the tradename NAFION®. Water is transferred from the water channels 24 through the porous, hydrophilic WTPs 21, 21a and the anode GDL 16, to moisturize the PEM.

At the catalyst layer, a reaction takes place in which two hydrogen diatomic molecules are converted catalytically to four positive hydrogen ions (protons) and four electrons. The protons migrate through the PEM to the cathode catalyst. The electrons flow through the fuel cell stack out of the electrical connections and through an external load, doing useful work. The electrons arriving at the cathode combine with two oxygen atoms and the four hydrogen ions to form two molecules of water. The reaction at the anode requires the infusion of water to the anode catalyst, while the reaction at the cathode requires the removal of product water which results from the electrochemical process as well as water dragged through the PEM from the anode by moving protons, and by osmosis.

The cathode catalyst layer 14 is similarly porous and the GDL 17 is porous to permit air from the channels 27 to reach the cathode catalyst and to allow product and proton drag water to migrate to the cathode WTP, where the water will eventually reach the water channels 24. In a power plant having an external water management system, the water will exit the stack for possible cooling, storage and return to the stack as needed.

At the end 34, a conventional end plate 35 of some sort (not to scale) facilitates provision of the coolant channels 24 at the anode end of the stack. The anode water transport plate 21a is depicted as being about the same thickness at the remaining anode water transport plates 21. However, in the general case, the plate 21a will be made thicker so as to retain stability with the deeper channels 20a.

In accordance with the modality herein, the fuel flow field plate 21a of the fuel cell 9a at the anode end 34 is provided with fuel flow field channels 20a which are significantly deeper than the fuel flow field channels 20 of the remaining fuel cells 9 of the fuel cell stack. The channels 20a may be deeper than the fuel channels 20 by about 0.15 mm to about 1.5 mm, or preferably from about 0.15 mm to about 0.5 mm, or more preferably from about 0.15 mm to about 0.25 mm. Or, the fuel flow channels 20a may be between about 45% and about 65% or even over 100% deeper than the fuel flow field channels 20 of the remaining fuel cells 9 in the stack. This results in the elimination of fuel starvation in the anode and fuel cell during a start below freezing.

The surprising thing is that instead of the increased depth also filling to the same degree with ice and thereby blocking the flow of fuel during startup, the amount of ice in each channel appears to remain about the same, whereby the increased depth is devoted substantially to volumes in which fuel reactant gas will flow.

The improvement in performance is accompanied with a reduction of, or substantial elimination of, carbon corrosion of the anode end cell as a consequence of cold weather starts.

Since changes and variations of the disclosed embodiments may be made without departing from the concept's intent, it is not intended to limit the disclosure other than as required by the appended claims.

The invention claimed is:

1. An apparatus, comprising:
a fuel cell stack including a plurality of contiguous fuel cells compressed between a pair of end plates, each of said fuel cells comprising an electrolyte with an anode catalyst layer on a first surface of the electrolyte and a cathode catalyst layer on a second surface of the electrolyte, an anode gas diffusion layer adjacent the anode catalyst layer and a cathode gas diffusion layer adjacent the cathode catalyst layer, an anode water transport plate having a fuel flow field including fuel flow field channels adjacent the anode gas diffusion layer and a cathode water transport plate having an oxidant flow field adjacent the cathode gas diffusion layer;
wherein each of the fuel flow field channels in the fuel flow field of the fuel cell at an anode end of the fuel cell stack have a respective depth measured perpendicularly to the first and second surfaces of the electrolyte, and each of the fuel flow field channels in the fuel flow fields of other fuel cells in the fuel cell stack have a respective depth measured perpendicularly to the first and second surfaces of the electrolyte;
wherein each of the depths of the fuel flow field channels in the fuel flow field of the fuel cell at an anode end of the fuel cell stack are deeper than each of the depths of the fuel flow field channels in the fuel flow fields of the other fuel cells in the fuel cell stack; and
wherein the fuel flow field channels in the fuel flow fields of the other fuel cells in the fuel cell stack are the fuel flow field channels in the fuel flow fields of all other fuel cells in the fuel cell stack.

2. The apparatus of claim 1 wherein each of the depths of the fuel flow field channels in the fuel flow fields of the other fuel cells in the fuel cell stack are between about 0.3 mm and about 0.5 mm.

3. The apparatus of claim 2 wherein each of the depths of the fuel flow field channels in the fuel flow field of the fuel cell at the anode end of the fuel cell stack are deeper than each of the depths of the fuel flow field channels in the fuel flow fields of the other fuel cells in the fuel cell stack by between about 0.15 mm and about 0.25 mm.

4. The apparatus of claim 1 wherein each of the depths of the fuel flow field channels in the fuel flow fields of the other fuel cells in the fuel cell stack are about 0.4 mm.

5. The apparatus of claim 1 wherein each of the depths of the fuel flow field channels in the fuel flow field of the fuel cell at the anode end of the fuel cell stack are at least twice as deep as each of the depths of the fuel flow field channels in the fuel flow fields of the other fuel cells in the fuel cell stack.

6. The apparatus of claim 1 wherein each of the depths of the fuel flow field channels in the fuel flow field of the fuel cell at the anode end of the fuel cell stack are deeper than each of the depths of the fuel flow field channels in the fuel flow fields of the other fuel cells in the fuel cell stack by between about 0.15 mm and about 1.5 mm.

7. The apparatus of claim 1 wherein each of the depths of the fuel flow field channels in the fuel flow field of the fuel cell at the anode end of the fuel cell stack are deeper than each of the depths of the fuel flow field channels in the fuel flow fields of the other fuel cells in the fuel cell stack by between about 0.15 mm and about 0.5 mm.

8. The apparatus of claim 1 wherein each of the depths of the fuel flow field channels in the fuel flow field of the fuel cell at the anode end of the fuel cell stack are deeper than each of the depths of the fuel flow field channels in the fuel flow fields of the other fuel cells in the fuel cell stack by between about 0.15 mm and about 0.25 mm.

9. The apparatus of claim 1 wherein each of the fuel flow field channels in the fuel flow field of the fuel cell at the anode end of the fuel cell stack have a common first depth measured perpendicularly to the first and second surfaces of the electrolyte, and each of the fuel flow field channels in the fuel flow fields of other fuel cells in the fuel cell stack have a common second depth measured perpendicularly to the first and second surfaces of the electrolyte, and the first depth is deeper than the second depth.

10. The apparatus of claim 9 wherein the first depth is deeper than the second depth by between about 35% and about 65% of the second depth.

11. The apparatus of claim 9 wherein the first depth is deeper than the second depth by between about 45% and about 65% of the second depth.

12. The apparatus of claim 9 wherein the first depth is deeper than the second depth by about 55% of the second depth.

* * * * *